Jan. 29, 1952    L. OSROW ET AL    2,584,044
FAUCET SPOUT CONNECTOR
Filed May 2, 1950
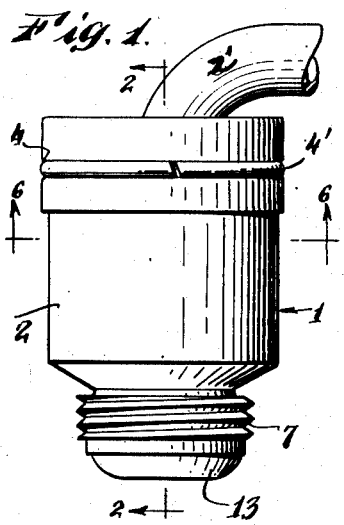
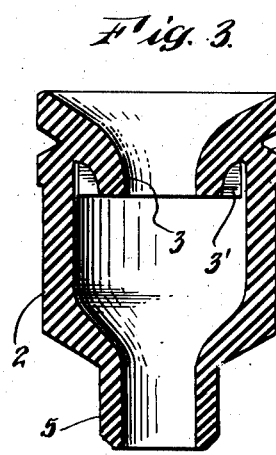
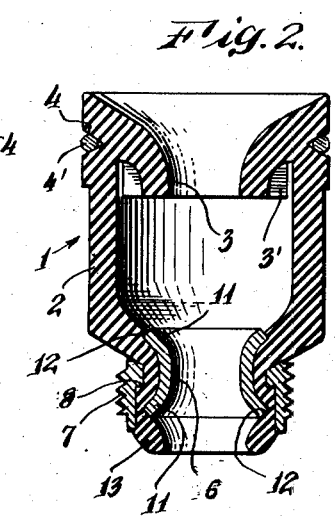
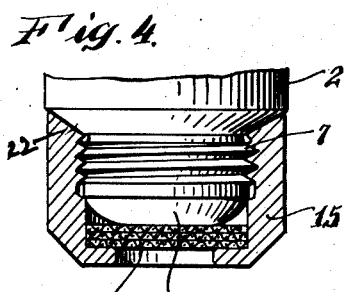
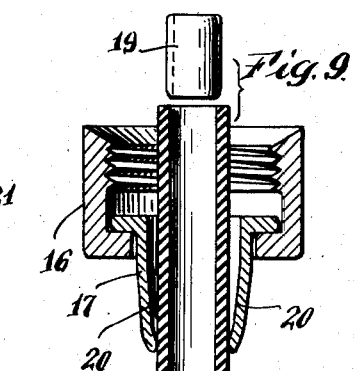
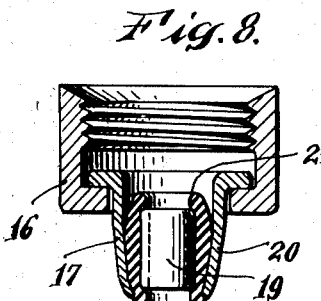
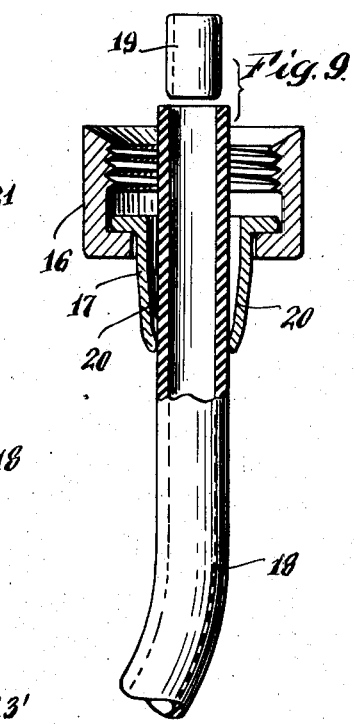
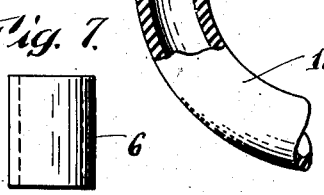
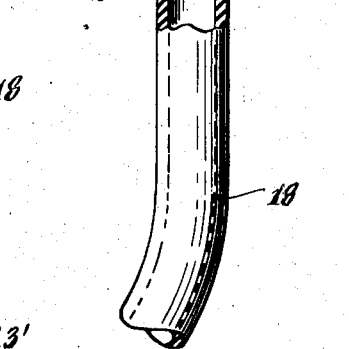
INVENTOR.
Leonard Osrow
BY Harold Osrow
Abraham Aaron
ATTORNEY.

Patented Jan. 29, 1952

2,584,044

UNITED STATES PATENT OFFICE 2,584,044

FAUCET SPOUT CONNECTOR

Leonard Osrow and Harold Osrow,
Queens County, N. Y.

Application May 2, 1950, Serial No. 159,422

1 Claim. (Cl. 285—90)

Our faucet spout connector is so designed as to give a tight fit around the various shaped faucets of varied sizes by use of a V groove near the top of the connector to receive a split ring which sets very snugly into the groove exerting pressure at the spout faucet so that it cannot be forced off by any water pressure. Where the faucet is larger than normal, the ring is removable and the tension of the rubber holds the connector firmly on the spout.

Our invention relates to faucets spout connectors which are secured to the spout and the said faucet connector has a removable strainer and a housing for the strainer.

Our invention pertains to a connector which is attached to a faucet spout with a multi-purpose, permitting a strainer to be screwed to the connector. Our connector serves also to allow a standard hose coupling to be attached to the base of the connector interchangeably, with the strainer. It permits a small hose which is also interchangeable to be attached to the same faucet spout connector and is another method of more securely attaching a small hose to a coupling.

Referring to the drawings which illustrate our invention:

Figure 1 is an elevation of the faucet spout connector.

Figure 2 is a section on the line 2—2 of Fig. 1.

Figure 3 is a section of the rubber housing.

Figure 4 is a fragmentary elevation of the portion of the connector with strainers attached in sections.

Figure 5 is a fragmentary sectional elevation on the method of forming the locking sleeve.

Figure 6 is a section taken on the line 6—6 of Fig. 1.

Figure 7 is an elevation of the locking sleeve before forming.

Figure 8 is a sectional view of the small hose coupling.

Figure 9 is a sectional view of the small hose coupling illustrating the sleeve before the insertion into the hose and before the hose is pulled down snugly into the coupling.

Referring specifically to the drawing:

A faucet spout connector 1 of rubber, comprising the body portion 2, a faucet spout 2' and encircling collar 3, reinforcing ribs 3', an annular V groove 4, a split ring 4', a depending portion 5 for insertion of the locking sleeve 6. A threaded ring 7 has its inner surface formed with the shoulder 8.

The said shoulder engages the rubber from the portion 5 upon pressure against the pre-inserted sleeve 6 by the two dies 9 and 10. The said dies form arcuate flanges 11 on to the sleeve 6 forcing the edges 12 into the rubber and more or less encircling the shoulder 8, thus preventing the threaded ring 7 from slipping off the rubber. The washer portion 13 is formed at the lower extremity of the connector 1, when sleeve 6 is formed into shape by dies 9 and 10 and applies slight pressure to the strainer 14, of strainer housing 15, and forms a seal when screen housing 15 is screwed to ring 7.

In Figures 8 and 9 a similar threaded attachment 16 is employed into which is inserted a flared tubing 17. Said hose coupling is locked to a hose 18 by similar locking sleeve 19 which is pulled into the position shown in Fig. 8. The rubber of the hose is forced outwardly and against the tapering walls 20 of the flared coupling tubing 17 and the excess rubber rolls over as at 21 thus holding the sleeve firmly and forming one unit with the coupling.

The washer portion 13 in Fig. 2 sets tightly against the flanged portion of the flared end of the flared tubing 17 when the hose coupling 16 is screwed securely to the threaded portion 7.

In Fig. 4 we show presently the strainer container 15 which may also be sealed against the shoulder 22 of the connector 1. The washer portion 13 may also be used to form a seal under all circumstances of adaptation.

The pressure of the water within the body of the connector forces the center portion outwardly causing the collar 3 to grip more tightly against the outer surface of the faucet spout. The split ring 4 is used for the usual sized faucet spout to hold the collar 3 secure against the faucet spout. Where the faucet spout is of larger than usual diameter the split ring 4 is removed to give a greater expansion at 3. The flexibility of the connector at 3 permits the use of connector on varied shaped faucet spouts, of slightly changing proportions.

Although the drawings and specification disclose the best use in which we have embodied our invention, we desire not to be limited to the details of such disclosure for in the adaptation, changes in form and proportion may be made as experience suggests without departing from the spirit of our invention wtihin the broad scope of the appended claim.

What we claim as new and novel is:

A faucet spout connector comprising a hollow tubular body of resilient material, a collar integral with one end of said body and extending into the interior thereof in spaced relation thereto, radially extending ribs formed integrally with, and connecting said collar and said body, an annular groove provided on the peripheral surface of said body adjacent the juncture of said body with said collar, a substantially rigid ring positioned within said groove and reenforcing said body at its juncture with said collar.

LEONARD OSROW.
HAROLD OSROW.

REFERENCES CITED

The following references are of record in the file of this patent:

UNITED STATES PATENTS

| Number | Name | Date |
| --- | --- | --- |
| 1,971,438 | Yoder | Aug. 28, 1934 |
| 1,984,347 | Sutton | Dec. 11, 1934 |
| 1,896,204 | Schacht | Feb. 7, 1933 |